United States Patent
Crudele et al.

(10) Patent No.: US 9,985,920 B2
(45) Date of Patent: *May 29, 2018

(54) EVENT NOTIFICATION (71) Applicant: International Business Machines Corporation, Armonk, NY (US)

(72) Inventors: Michele Crudele, Rome (IT); Antonio M. Sgro, Fiumicinol (IT)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 14/686,971

(22) Filed: Apr. 15, 2015

(65) Prior Publication Data

US 2016/0087927 A1    Mar. 24, 2016

Related U.S. Application Data (63) Continuation of application No. 14/489,593, filed on Sep. 18, 2014.

(51) Int. Cl.
*H04L 12/58* (2006.01)
*H04L 29/08* (2006.01)
(Continued)

(52) U.S. Cl.
CPC .......... *H04L 51/32* (2013.01); *G06F 17/3087* (2013.01); *G06Q 10/10* (2013.01);
(Continued)

(58) Field of Classification Search
CPC ..... H04L 51/32; H04L 51/20; H04L 12/1895; H04L 67/18; H04L 67/22; H04L 67/02; G06Q 10/10; G06Q 50/01; G06F 17/3087
See application file for complete search history.

(56) References Cited

U.S. PATENT DOCUMENTS

2009/0112525 A1   4/2009 Adani
2010/0312769 A1* 12/2010 Bailey ............... G06F 17/30705
                                                                      707/740
(Continued)

OTHER PUBLICATIONS

Carter, et al., "Social Media and Emergency Management: Exploring State and Local Tweets", 2014 47th Hawaii International Conference on System Science, © 2014 IEEE, Computer Society, pp. 1968-1977, <http://ieeexplore.ieee.org/xpl/login.jsp?tp=&arnumber=6758847&url=http%3A%2F%2Fieeexplore.ieee.org%2Fxpls%Fabs_all.jsp%3Farnumber%3D6758847>.

(Continued)

*Primary Examiner* — Scott B Christensen
(74) *Attorney, Agent, or Firm* — Christopher McLane; Maeve M. Carpenter; Daniel R. Simek (57) ABSTRACT

In an approach to event notification, one or more computer processors determine a baseline for a volume of activity on a social media website in a geographic location. One or more computer processors determine whether a deviation from the baseline for the volume of activity occurs. Responsive to determining a deviation from the baseline occurs, one or more computer processors identify an event that caused the deviation. One or more computer processors calculate an estimate of population for the geographic location. One or more computer processors identify based, at least in part, on the identified event and the estimated population, a relevant party to be notified of the event. One or more computer processors generate a recommendation based, at least in part, upon one or more of the identified event, the estimate of population, and the identified relevant party.

6 Claims, 4 Drawing Sheets

(51) Int. Cl.
  G06F 17/30    (2006.01)
  G06Q 10/10    (2012.01)
  H04L 12/18    (2006.01)
  G06Q 50/00    (2012.01)

(52) U.S. Cl.
  CPC .......... H04L 12/1895 (2013.01); H04L 51/20 (2013.01); H04L 67/02 (2013.01); H04L 67/18 (2013.01); H04L 67/22 (2013.01); G06Q 50/01 (2013.01)

(56) References Cited

U.S. PATENT DOCUMENTS

| | | | |
|---|---|---|---|
| 2012/0016948 A1* | 1/2012 | Sinha | G06Q 10/10 709/207 |
| 2012/0064910 A1 | 3/2012 | Cornett et al. | |
| 2012/0066345 A1 | 3/2012 | Rayan et al. | |
| 2012/0265580 A1* | 10/2012 | Kobayashi | G06Q 30/02 705/7.31 |
| 2013/0035859 A1 | 2/2013 | Guatteri et al. | |
| 2013/0218959 A1 | 8/2013 | Sa et al. | |
| 2014/0278031 A1* | 9/2014 | Scofield | G08G 1/00 701/118 |
| 2014/0377727 A1* | 12/2014 | Yom-Tov | A61B 5/165 434/236 |
| 2015/0178282 A1* | 6/2015 | Gorur | G06F 17/30867 707/748 |

OTHER PUBLICATIONS

Matsumura, et al., "System and Service to Detect Disaster and to Inform it to Users", An IP.com Prior Art Database Technical Disclosure, IP.com No. IPCOM000207970D, IP.com Electronic Publication: Jun. 16, 2011, <http://ip.com/IPCOM/000207970>.

List of IBM Patents or Patent Applications Treated as Related, Apr. 8, 2015.

Michele Crudele, et al., "Event Notification", U.S. Appl.No. 14/489,593, filed Sep. 18, 2014, (a copy is not provided as this application is available to the Examiner).

* cited by examiner

EVENT NOTIFICATION

BACKGROUND OF THE INVENTION

The present invention relates generally to social media, and more particularly to determining an event and notifying relevant parties of the event.

Social media is the social interaction among people in which the people can create, share, or exchange information and ideas in virtual communities and networks. Furthermore, social media depends on mobile and web-based technologies to create highly interactive platforms in which individuals and communities share, co-create, discuss, and modify user-generated content. They introduce substantial and pervasive changes to communication between organizations, communities, and individuals.

Social media differs from traditional or industrial media in many ways, including reach, frequency, usability, immediacy, and permanence. Social media technologies take on many different forms including magazines, Internet forums, weblogs, social blogs, microblogging, wikis, social networks, podcasts, photographs or pictures, video, rating and social bookmarking. Technologies include blogging, picture-sharing, video blogs, wall-posting, music-sharing, crowdsourcing, and voice over Internet protocol (IP), to name a few. Social network aggregation can integrate many of the platforms in use.

SUMMARY

Embodiments of the present invention disclose a method, a computer program product, and a system for event notification. One or more computer processors determine a baseline for a volume of activity on a social media website in a geographic location. One or more computer processors determine whether a deviation from the baseline for the volume of activity occurs. Responsive to determining a deviation from the baseline occurs, one or more computer processors identify an event that caused the deviation. One or more computer processors calculate an estimate of population for the geographic location. One or more computer processors identify based, at least in part, on the identified event and the estimated population, a relevant party to be notified of the event. One or more computer processors generate a recommendation based, at least in part, upon one or more of the identified event, the estimate of population, and the identified relevant party.

DETAILED DESCRIPTION

Implementation of embodiments of the invention may take a variety of forms, and exemplary implementation details are discussed subsequently with reference to the Figures.

Figure 1:
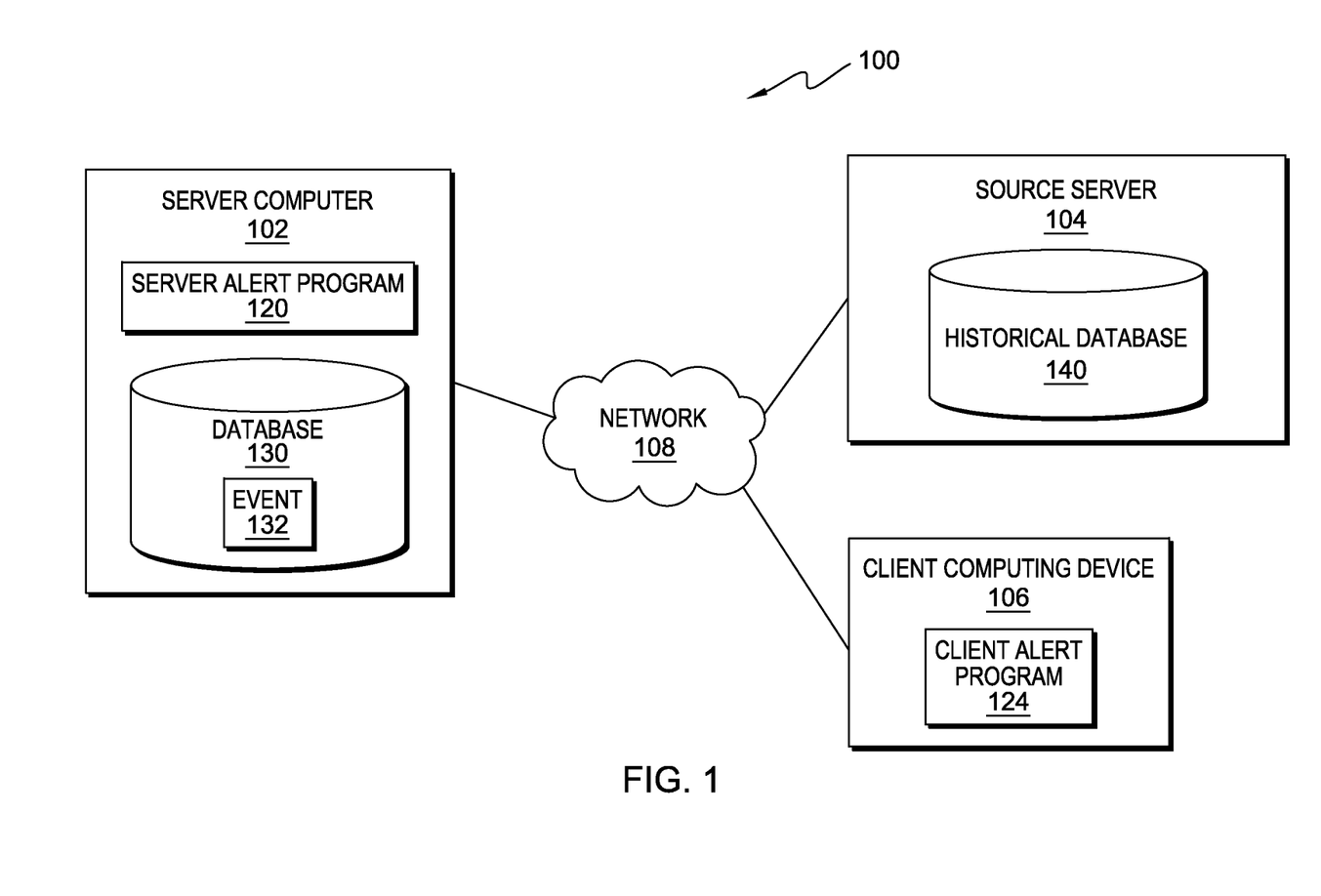
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 102, source server 104, and client computing device 106, all interconnected over network 108. Network 108 represents, for example, a telecommunications network, a local area network (LAN), a wide area network (WAN), such as the Internet, or a combination of the three, and includes wired, wireless, and/or fiber optic connections. Network 108 includes one or more wired and/or wireless networks that are capable of receiving and transmitting data, voice, and/or video signals, including multimedia signals that include voice, data, and video information.

In the depicted environment, server computer 102 is one or more of a management server, a Web server, or any other electronic device or computing system capable of receiving and sending data. In other embodiments, server computer 102 represents a server computing system utilizing multiple computers as a server system, such as in a cloud computing environment. In another embodiment, server computer 102 represents a laptop computer, a tablet computer, a netbook computer, a personal computer (PC), a desktop computer, a personal digital assistant (PDA), a smart phone, or any programmable electronic device capable of communicating with source server 104 and client computing device 106 via network 108. In another embodiment, server computer 102 represents a computing system utilizing clustered computers and components to act as a single pool of seamless resources. Server computer 102 includes server alert program 120 and database 130.

In depicted distributed data processing environment 100, server alert program 120 resides on server computer 102 and identifies events, creates recommendations, and sends alerts to a client computing device (e.g., client computing device 106). In one embodiment, server alert program 120 is constantly monitoring Internet traffic via network 108, such as individual social media posts, as it is related to a geographic location (e.g., region, city, state, environment, etc.) to establish a baseline traffic volume originating from or pertaining to geographic areas. In one example, the individual social media posts may come from other users within distributed data processing environment 100 operating client devices (not shown) that may be originating in a certain location. Once a baseline has been established for the geographic locations, server alert program 120 identifies deviations from the baseline and sends recommendations to relevant parties, which are identified based on a causation of the deviation from the baseline. Because a baseline can change over time, the longer server alert program 120 is active, the more accurate server alert program 120 can be in establishing an accurate baseline as server alert program 120 has more data to utilize. Server alert program 120 is depicted and described in further detail with respect to FIG. 2.

In the depicted embodiment, database 130 resides on server computer 102 and contains event 132. In another embodiment, database 130 resides elsewhere in distributed data processing environment 100. A database is an organized collection of data. Database 130 is implemented with any type of storage device capable of storing data that is accessed and utilized by server computer 102 and client computing device 106, such as a database server, a hard disk drive, or a flash memory. In other embodiments, database 130 represents multiple storage devices within server computer 102. Database 130 stores previous recommendations, events, alerts, responses from client devices, etc., such as event 132, which are stored after an alert has been sent by server alert program 120. Database 130 enables server alert program 120 to improve alerts and recommendations based on previous recommendations, feedback, and alerts sent by server alert program 120.

In the depicted environment, source server 104 is one or more of a management server, a Web server, or any other electronic device or computing system capable of receiving and sending data. In other embodiments, source server 104 represents a server computing system utilizing multiple computers as a server system, such as in a cloud computing environment. In another embodiment, source server 104 represents one or more of a laptop computer, a tablet computer, a netbook computer, a personal computer (PC), a desktop computer, a personal digital assistant (PDA), a smart phone, or any programmable electronic device capable of communicating with server computer 102, via network 108. In another embodiment, source server 104 represents a computing system utilizing clustered computers and components to act as a single pool of seamless resources. Source server 104 communicates with server alert program 120 to allow server alert program 120 access to historical information, such as information located in historical database 140, that server alert program 120 identifies as having similarities to the event determined to cause a deviation from the baseline, such as a scale of the event, a location of the event, a type of event, a time of day of the event, etc.

In the depicted embodiment, historical database 140 resides on source server 104 and contains historical data. In another embodiment, historical database 140 resides elsewhere in distributed data processing environment 100. A database is an organized collection of data. Historical database 140 is implemented with any type of storage device capable of storing data that is accessed and utilized by source server 104, such as a database server, a hard disk drive, or a flash memory. In other embodiments, historical database 140 represents multiple storage devices within source server 104. Historical database 140 stores historical data including historical events, alerts, responses, reactions, etc., such as a hurricane or earthquake, which have been stored in a database. Examples of data in historical database 140 comprise: links to news agency websites; libraries; encyclopedias; government websites; etc. Historical database 140 enables server alert program 120 to improve alerts and recommendations based on historical data for an event that is identified as similar to the event that created the deviation from the baseline of volume, for example, by type of event, location, amount of people involved, or any other characteristics that may be used to improve a recommendation or alert by adding information.

In the depicted embodiment, client computing device 106 is one or more of a desktop computer, a laptop computer, a tablet computer, a specialized computer server, a smart phone, a wearable computing device or any programmable electronic device capable of communicating with server computer 102 via network 108 and with various components and devices within distributed data processing environment 100. In general, client computing device 106 represents any programmable electronic device or combination of programmable electronic devices capable of executing machine readable program instructions and communicating with other computing devices via a network, such as network 108. While depicted as a single client computing device in FIG. 1, client computing device 106 may be multiple devices capable of disseminating information to multiple clients or users within distributed data processing environment 100. Client computing device 106 contains client alert program 124 and enables an alert to be disseminated to users of client computing device 106.

In depicted distributed data processing environment 100, client alert program 124 resides on client computing device 106 and receives alerts and recommendations from server alert program 120, as well as, sending feedback information to server alert program 120 via network 108. In an embodiment, client alert program 124 alerts a user of client computing device 106 after receiving an alert from server alert program 120. Examples of a user may comprise individuals, businesses, and/or government organizations such as hospitals, doctors, emergency response teams, firehouses, news organizations, etc. In an example, client alert program 124 sounds an audio alert with an audio recommendation on client computing device 106. In another example, client alert program 124 may display a visual alert or vibrate as an alert. In one example, client alert program 124 may use a combination of the aforementioned alerts, such as sound an audio alarm, display a visual recommendation, and vibrate the device. Client alert program 124 may also continue to alert and send recommendations to a user until a user acknowledges an alert or turns it off.

Figure 2:
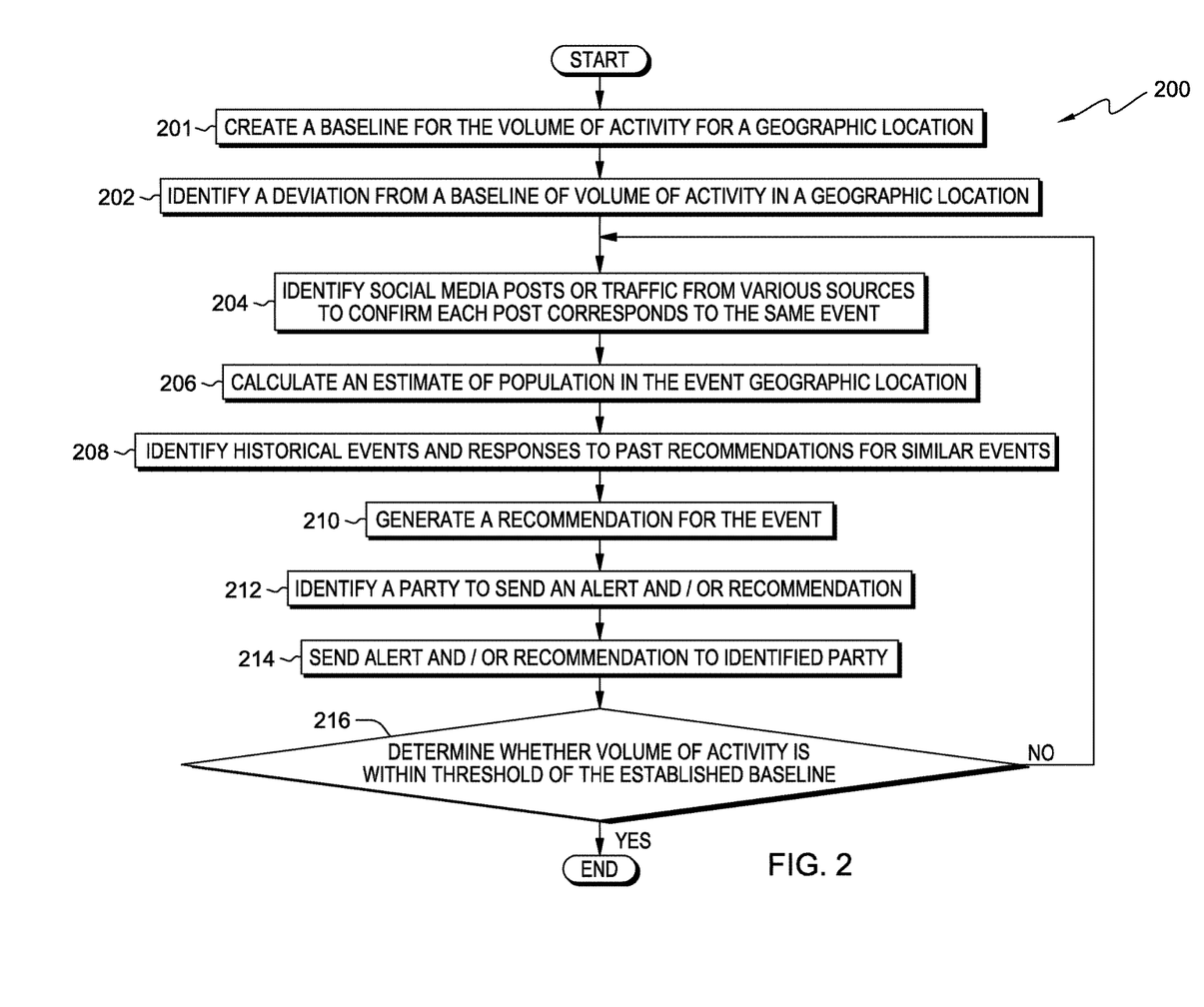
FIG. 2 is a flowchart depicting operational steps of a program for identifying events and sending recommendations to relevant parties within the distributed data processing environment of FIG. 1, in accordance with an embodiment of the present invention.

FIG. 2 is a flowchart depicting operational steps of server alert program 120, in accordance with an embodiment of the present invention. Server alert program 120 operates on server computer 102 to monitor Internet activity (e.g., social media posts) pertaining to or originating from a geographic location and sending alerts and recommendations to client computing devices (e.g., client computing device 106). In one embodiment, server alert program 120 is continuously monitoring the Internet for deviations from an established baseline of activity pertaining to a geographic location. When a deviation in the baseline reaches a preset threshold, such as a 20% increase or decrease in activity, the operational steps of FIG. 2 begin. In another embodiment, the threshold may depend on the geographic location or event, such as a geographic location that has been determined to be sensitive (e.g., a university or other school location) or event deemed sensitive (e.g., threat of tenor attack) with a smaller deviation from the baseline such as 5%. In another embodiment, a small deviation from the baseline may trigger server alert program 120 to determine what has caused the deviation and then determine if the geographic location or event is sensitive at which time if the geographic location or event is sensitive it would begin processing according to the steps of FIG. 2.

Server alert program 120 creates a baseline for the volume of activity for a geographic location (step 201). Server alert program 120 determines the baseline for the volume of activity in the geographic location using, for example, a volume of traffic on a social media website. In one embodiment, server alert program 120 monitors a specific geographic location to establish a volume of traffic originating from and/or pertaining to the specific geographic location. In one example, server alert program 120 has preset regions and locations that it searches for. In another example, server alert program 120 creates a database for all locations that server alert program 120 can create a baseline from. In another embodiment, server alert program 120 monitors specific social media websites to determine where the posts originate from. Server alert program 120 may then create a baseline by collecting data from where posts originated and/or pertaining to the location.

Server alert program 120 identifies a deviation from a baseline of volume of activity in a geographic location (step 202). Server alert program 120 determines a deviation from the baseline within a threshold percentage, for example, server alert program 120 identifies a 20% increase in social media posts on a social media website located on a server within distributed data processing environment 100. Server alert program 120 identifies the event, or events that are causing the deviation in volume of activity on the social media website originating from, or pertaining to, the geographic location. In an example, server alert program 120 searches for keywords pertaining to location, city, state, or any location descriptive terms as well as the location where posts originated (e.g., GPS coordinates from a phone, IP addresses, latitude, and longitude, etc.). Server alert program 120 can also determine what event or events are taking place that are causing the increase in social media posts. Server alert program 120 applies known methods of natural language processing and cognitive techniques to the social media posts to determine the type of event or events that are causing the increase in traffic. In various embodiments, server alert program 120 can also determine information regarding an event from sensors (e.g., weather stations) and text analytics on messages from social networking sites.

Server alert program 120 identifies social media posts or traffic from various sources to confirm each post corresponds to the same event (step 204). In an embodiment, server alert program 120 identifies an event creating an increase in social media volume and searches, via network 108, for deviations from the determined baseline on other social media sites pertaining to the identified geographic location to determine if the social media posts correspond to the same event. In an example, there may be two different celebrities sighted in the same location, triggering an increase in social media activity in a location which creates a deviation in volume from the determined baseline on multiple websites. Server alert program 120 identifies it is pertaining to the same event, such as an award ceremony. In another example, two social media websites have an increase in activity and server alert program 120 confirms that both of the increases in activity are due to a tornado that touched down in that geographic location. In another example, server alert program 120 verifies that the same event has caused an increase in social media post volume on several social media websites for multiple geographic locations, such as a hurricane that is affecting multiple cities, states, or countries.

Server alert program 120 calculates an estimate of population in the event geographic location (step 206). By creating an accurate estimate of the population in the area the event is located in, server alert program 120 can create an accurate recommendation. In another embodiment, server alert program 120 queries source server 104 or historical database 140 for the population of a city, such as one listed on the most recent census. In one embodiment, server alert program 120 also begins to strictly monitor for characteristics and evolution of the event once it has determined that the identified events from different sources correspond to the same event.

In an embodiment, server alert program 120 calculates an estimation of the population by estimating the population from the social media activity. For example, server alert program 120 calculates an estimate of the population by first interrogating static demographic sources from historical database 140 to get a first estimate of people (Xo). Then, server alert program 120 calculates a social activity behavior from historical data sources, such as social networks and telephonic traffic located in historical database 140 and previous events (e.g., event 132) located in database 130, which is indicated as the number of messages originating from the given area (Sot). "Sot" is a function of specific periods, such as time of day, days of the week, months, etc. Server alert program 120 peaks the value of "Sot" relative to the time of the event. Next, server alert program 120 searches historical data sources, such as social networks and telephonic traffic located in historical database 140 and previous events (e.g., event 132) located in database 130, to obtain the behavior of the social activity of an individual in the face of a similar event during the same time period as "Sot" (Se). Server alert program 120 can estimate the total number of messages emitted from a "Xo" population in the face of an event (Set=Se*Xo). Server alert program 120 also measures the real volume of messages (S'et), which means (S'et=Se*X'o) where "X'o" is the real population in the geographic location of the event. Therefore, server alert program 120 can estimate the real population present in a geographic location at the time of the event by (X'o=S'et/Se).

Server alert program 120 identifies similar historical events and responses to past recommendations for similar events (step 208). In an embodiment, server alert program 120 queries source server 104 for information pertaining to the determined event and geographic location. Server alert program 120 uses natural language processing and cognitive techniques to identify similar historical data as well as looking for keywords, location, and metadata pertaining to the current triggering event. In an example, server alert program 120 queries source server 104 and historical database 140 for information pertaining to the current triggering event, such as a fire in a high-rise in a large city. Server alert program 120 queries for newspaper articles, university papers, news reports, city procedures, etc. to collect sufficient data to create a recommendation for the event. Server alert program 120 also identifies events, past alerts, and recommendations in database 130, such as event 132. To further the example, server alert program 120 may look for information pertaining to building fires in a large city, the same city, a city of similar population in the same country or region, a city with a similar response protocol, a city with a similar building code, etc. Continuing the example, server alert program 120 may then search the identified data for the average amount of firemen needed to put out a fire of this size, the amount of people who will need treatment in a hospital for a fire at this hour in a building of this size, the amount of police needed to help secure the area, and the hospital personnel needed to treat this amount of people.

Server alert program 120 generates a recommendation for the event (step 210). Server alert program 120 can generate a recommendation for the event based on the identified event and the estimated population in the geographic location. In an embodiment, server alert program 120 compares the historical data from source server 104 and historical database 140 to a past recommendation of server alert program 120 stored in database 130, such as event 132. In an example, server alert program 120 determines that a past recommendation is similar to a historical event because they are both related to earthquakes in developed cities of similar populations. The result of the comparison allows server alert program 120 to generate a better recommendation by comparing historical data and feedback from previous event recommendations (e.g., event 132) to generate an optimized recommendation. The comparison also allows for server alert program 120 to determine a likely future evolution of the event. In one embodiment, server alert program 120 generates a recommendation based at least in part on an identified relevant party. In an example, server alert program 120 has identified that hospitals need a recommendation and generates a recommendation specific to hospitals.

Server alert program 120 identifies a party to send an alert and/or recommendation (step 212). In an embodiment, server alert program 120 determines which parties to send alerts to, such as police departments, government agencies, hospitals, and even individuals based, at least in part, on the identified event and the estimated population in the geographic location. In an example, server alert program 120 determines a relevant party to send an alert and/or recommendation to based on the determined event and recommendation. To further the example, the recommendation may include sending a recommendation to multiple hospitals. Server alert program 120 may then query historical database 140 to identify the location of the closest hospitals to the event. In one embodiment, by continuously monitoring the event and the population that is affected by the event, server alert program 120 can quickly change recommendations and parties to alert.

Server alert program 120 sends alerts and recommendations to identified parties (step 214). In one embodiment, server alert program 120 sends alerts and recommendations to a party that it has determined should be alerted in the previous steps, as long as the party has access to server alert program 120. For example, server alert program 120 determines that a police station needs to send 10 police cars to a location. In this example, server alert program 120 may send an alert to client alert program 124, which in one instance broadcasts information across the police radio to send 10 police cars to a location. In another example, client alert program 124 receives the alert and recommendation at a computer at the police station. A user of the computer would then take action based on the recommendation.

In another embodiment, access to server alert program 120 could be through an application on a computing device, such as a phone, tablet, or computer. In one embodiment, the party could also subscribe to a service that utilizes server alert program 120 which then has a user alert the identified parties with a recommendation. In an example, client alert program 124 may not be needed, or it may be located on the same computing device as server alert program 120. In an embodiment, client alert program 124 may be located on a device specifically for the program. For example, a subscriber may be given client computing device 106, such as a paging device, if they sign up for service. In yet another embodiment, client alert program 124 may not have to be on a client computing device, but server alert program 120 still sends a signal, alert, or message of some kind to client devices for parties that server alert program 120 has identified as needing an alert and recommendation. For example, server alert program 120 determines that there is a need for 10 police cars at a location, but the nearest police department does not have access to a client computing device (e.g., client computing device 106) which contains client alert program 124. In this example, server alert program 120 still sends an alert and recommendation to the police department via phone, email, radio, or any other method known in the art.

In an embodiment, server alert program 120 sends the historical references that were used to create the recommendation along with the alert and recommendation. This allows a user that receives the alert and recommendation to verify information or come up with a new plan of action. In another embodiment, server alert program 120 may find no references in historical database 140 and no previous events in database 130. In an example, server alert program 120 still generates a recommendation based on protocols. The protocols may be from government sources or preset by a user. Server alert program 120 may also include in the alert and recommendation information indicating that no known similar events were discoverable.

Server alert program 120 determines whether the volume of activity is within a threshold of the established baseline (decision 216). In an embodiment, server alert program 120 continues to monitor the event and send updated recommendations based on new information until the volume of activity returns to within a percentage deviation of the established baseline. In this embodiment, server alert program 120 determines that the volume of activity is not within the threshold of the established baseline and goes to step 204 (no branch, decision 216). For example, as soon as the volume of activity deviates by 20% thereby triggering the event and starting the operational steps of the flow chart, server alert program 120 will continue to proceed through steps 202 to 212 until the percentage of deviation is below a 5% deviation from the baseline. In various embodiments, the threshold determination for the percent of deviation from the baseline for the operational steps of FIG. 2 to stop can be set by user, determine based on the sensitivity of an event or location, feedback from a user of client alert program 124, or another form known in the art. In an embodiment, the volume of activity is within a threshold of the established baseline and server alert program 120 goes to end (yes branch, decision 216).

In one embodiment, a user of client alert program 124 sends a response to server alert program 120. In an example, a hurricane is approaching a coastline and a first recommendation was sent to a user of client alert program 124, such as a government agency, to add 1,000 sandbags to a levy. The user of client alert program 124 only has 500 sandbags, and a reply is received by server alert program 120 containing this information. Server alert program 120 identifies additional parties to send a second alert and recommendation to which can provide the additional sandbags based upon the received information from client alert program 124.

In another embodiment, server alert program 120 continues to search for new posts and information pertaining to the event on source server 104, as well as update information regarding the population of people in the geographic location of the event. In an example, new information is posted that states that there are multiple targets for a terrorist threat. Server alert program 120 then sends additional alerts and recommendations based upon the new information.

Figure 3:
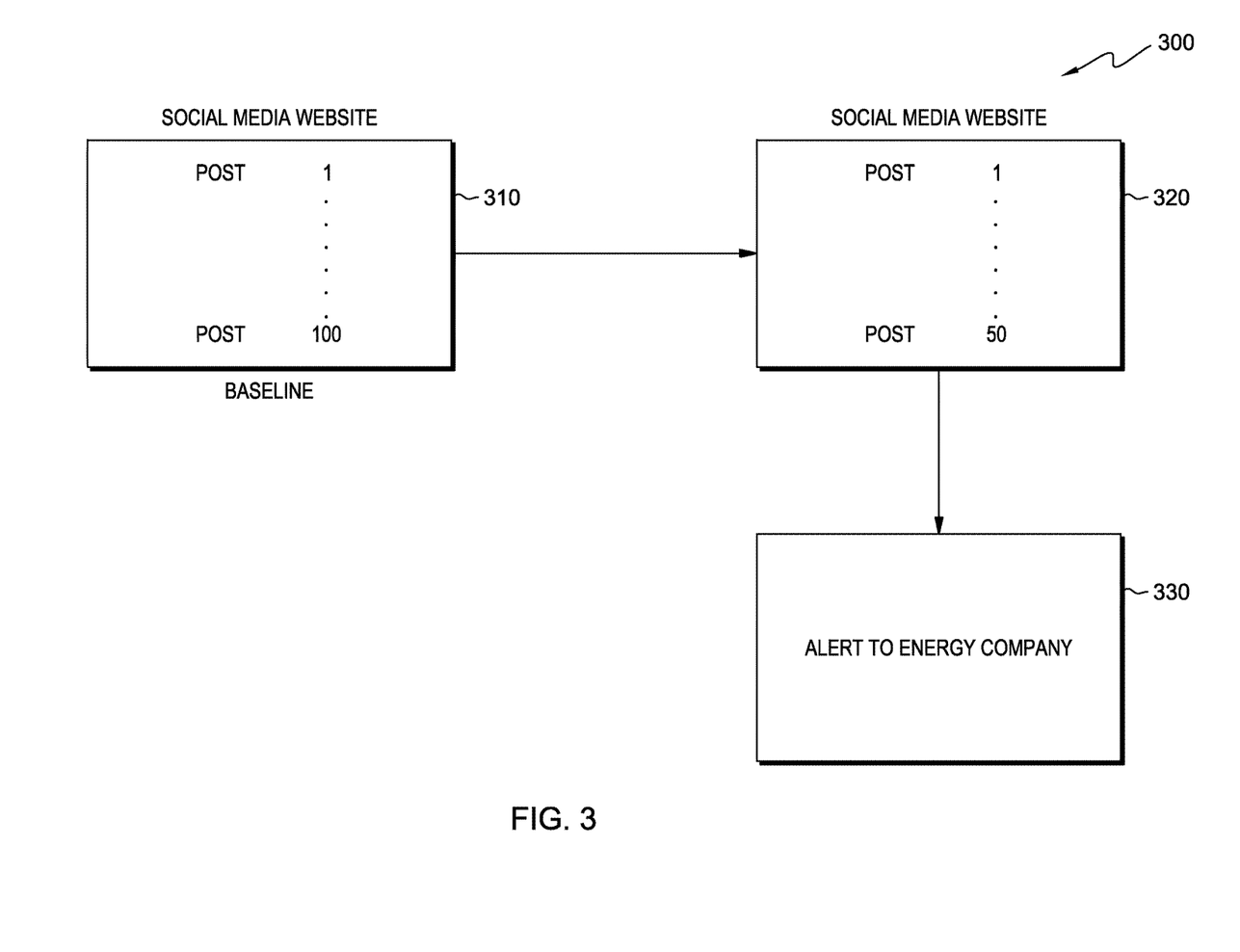
FIG. 3 is a flow diagram depicting operational steps of an example embodiment for identifying a deviation in volume of a social media website and sending a recommendation to a determined relevant party, in accordance with an embodiment of the present invention.

FIG. 3 is a flow diagram depicting operational steps of an example embodiment for identifying a deviation in volume of a social media website and sending a recommendation to a determined relevant party, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

In an example embodiment, server alert program 120 identifies a baseline in volume of posts for a social media website pertaining to a geographic location (box 310). Server alert program 120 identifies a 50% decrease from a baseline of volume of activity in a geographic location (box 320). Server alert program 120 identifies that the decrease in volume is due to a solar flare that impacted the region causing the loss of electronic capabilities. Server alert program 120 calculates an estimate of the population for the geographic location based upon a past census from historical database 140. Server alert program 120 identifies similar historical events and determines a relevant party that should receive a recommendation and alert regarding the solar flare event, for example, a power company. Server alert program 120 sends the recommendation and alert to the power company to increase the number of personnel currently at work and to fix the electrical grid based on the effects of the solar flare (box 330). Server alert program 120 continues to monitor the event and receives feedback from the power company stating that they do not have enough personnel to handle the problem, at which time server alert program 120 sends an alert and recommendation to a government agency to assist the power company. Server alert program 120 continues to monitor and send alerts until the volume of activity for the geographic location has returned to within 10% of the established baseline.

Figure 4:
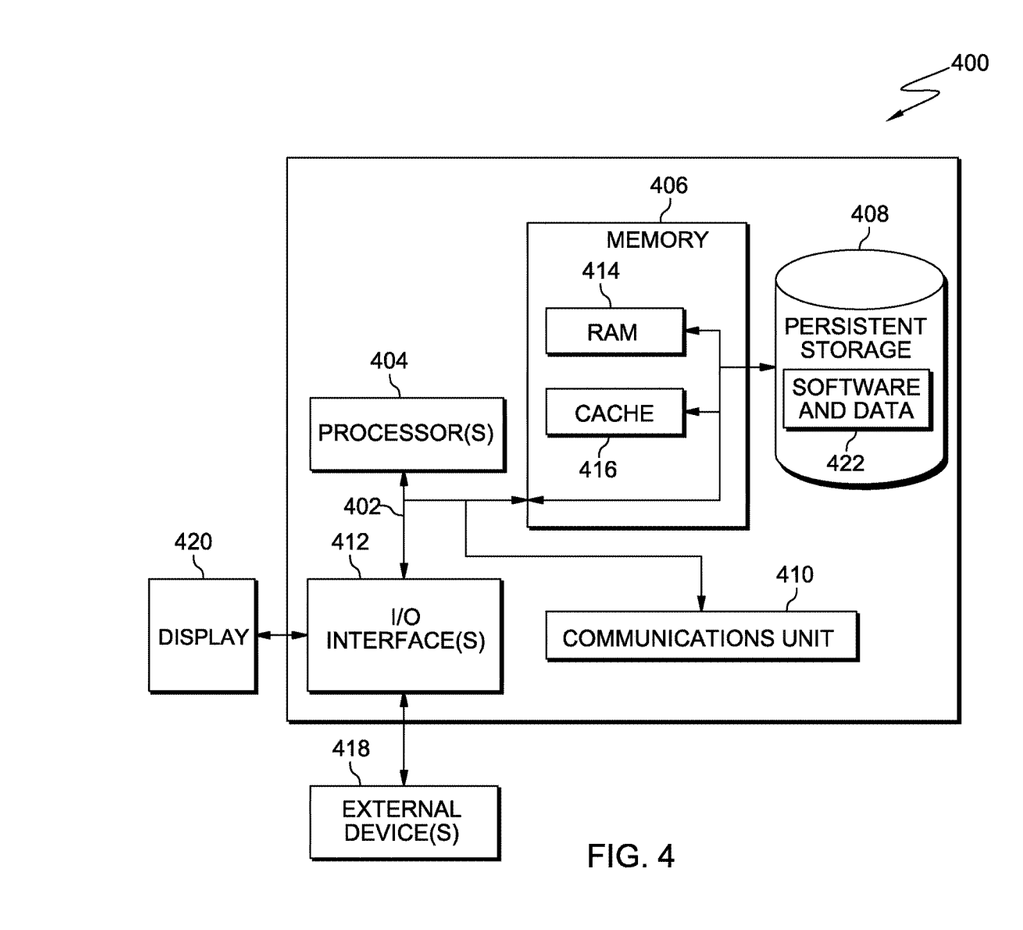
FIG. 4 depicts a block diagram of components of a data processing system, such as the server computer of FIG. 1, in accordance with an embodiment of the present invention.

FIG. 4 depicts a block diagram of components of computer 400, which is representative of server computer 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to server computer 102, software and data 422 represents server alert program 120 and database 130.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for event notification, the method comprising:
   continuously monitoring traffic associated with a geographic location and determining, by one or more computer processors based on the monitored traffic, a baseline for a volume of activity on a social media website in the geographic location;
   determining, by the one or more computer processors, whether a deviation from the baseline for the volume of activity occurs based on the monitoring;
   responsive to determining the deviation from the baseline occurs, identifying an event that caused the deviation based on content of the activity on the social media website corresponding to the determined deviation;
   calculating, by the one or more computer processors, an estimate of population for the geographic location;
   determining, by the one or more computer processors, based, at least in part, on the identified event and the estimated population, one or more relevant parties to be notified of the event,
      wherein the one or more relevant parties are determined based on the identified event;
   generating, by the one or more computer processors, recommendations for each of the determined one or more relevant parties based, at least in part, upon the identified event, the estimate of population, similar historical events, and the determined one or more relevant parties, wherein the recommendation contains specific instructions for each of the determined one or more relevant parties to respond to the event in relation to the location of the relevant party and the estimated population; and sending the generated recommendations to each of the determined one or more relevant parties.

2. The method of claim 1, further comprising:

determining, by one or more computer processors, an update to the generated recommendation based, at least in part, on one or more of: an update to the event, an update to the estimated population, and an update received from the identified relevant party regarding the generated recommendation; and sending, by one or more computer processors, the determined update containing the generated recommendation to the identified relevant party that will be affected by the event.

3. The method of claim 1, further comprising:

determining, by one or more computer processors, whether the volume of activity on the social media website returns to within a threshold percentage of the determined baseline;

responsive to determining the volume of activity on the social media website has not returned to within the threshold, generating, by one or more computer processors, an update to the generated recommendation for the identified relevant party; and sending, by one or more computer processors, the generated update to the identified relevant party.

4. The method of claim 1, wherein identifying the event further comprises:

determining, by one or more computer processors, the deviation in volume of activity is within a threshold percentage from the determined baseline in volume of activity.

5. The method of claim 1, wherein generating the recommendation further comprises:

identifying, by one or more computer processors, a past event that corresponds to the identified event that created the deviation in the volume of activity on the social media website; and generating, by one or more computer processors, the recommendation, is at least in part, based upon the identified past event that corresponds to the identified event that created the deviation in the volume of activity.

6. The method of claim 1, wherein generating the recommendation further comprises generating the recommendation based, at least in part, on the identified relevant party.

* * * * *